Patented Apr. 30, 1935

1,999,997

UNITED STATES PATENT OFFICE 1,999,997

MIXED BENZANTHRONE-ANTHRAQUINONE SELENOETHERS

Melvin A. Perkins, Milwaukee, Wis., assignor to E. I. du Pont de Nemours & Company, Wilmington, Del., a corporation of Delaware No Drawing. Application December 20, 1933, Serial No. 703,250

4 Claims. (Cl. 260—61)

This invention relates to the preparation of new mixed benzanthronyl-anthraquinonyl selenoethers and to a process particularly suitable for their preparation. In U. S. application Ser. No. 703,248, a method of forming Bz1-dibenzanthronyl selenoethers is described in which Bz1-halogenbenzanthrone compounds are condensed with Bz1-benzanthrone selenols, diselenides or selenolates, by which process either symmetrical or unsymmetrical benzanthronyl selenoethers may be formed. In U. S. application Ser. No. 703,249, the preparation of anthraquinonyl selenoethers by a similar process is described.

I have now found that new mixed benzanthronyl-anthraquinonyl selenoethers may be obtained by heating a selenol, selenolate or diselenide of one series with a halogen compound of the other series in the presence of a solvent and in the presence of acid binding agents, where the selenols or diselenides are used, and in the presence or absence of catalysts. By this process new unsymmetrical selenoethers are produced, some of which are useful as dyestuffs but which find particular use as intermediates for the preparation of dyestuffs.

In carrying out this reaction the use of approximately molecular quantities of the reactants is preferred, although an excess of either is not detrimental.

Without any intention of being limited thereby the following specific examples are given to more fully illustrate the principles of my invention. The parts used are by weight.

Example 1

6.2 parts of Bz1-Bz1'-benzanthronyl-diselenide, 4.8 parts of 1-chloro-anthraquinone and 2 parts of anhydrous sodium acetate are stirred into 80 parts of molten naphthalene and the mixture heated to reflux for about 17 hours. At the end of this time, the mass is cooled slightly, drowned in solvent naphtha, cooled and filtered. The residue is washed with alcohol and then with hot water. The product obtained is an orange-yellow solid containing 15.0% selenium. Theory for anthraquinonyl-benzanthronyl selenide is 15.4% selenium.

It gives an intense bluish-green solution in sulphuric acid and a violet coloration in alcoholic potassium hydroxide. Upon fusing in the latter mixture, an olive melt is obtained. Upon dilution and vatting, an olive brown vat is obtained, from which cotton is dyed a bluish-violet somewhat resembling that produced by dibenzanthrone.

The original selenoether, before fusion, yields a brownish-violet vat but has practically no affinity for vegetable fibers.

Example 2

By using 5.7 parts of 2-bromo-anthraquinone in place of the 4.8 parts of 1-chloro-anthraquinone used in Example 1, an orange-yellow solid, somewhat less reddish than that of Example 1 is obtained. It contains one atomic proportion of selenium. It likewise dissolves in sulphuric acid with a strong bluish-green coloration and gives a violet solution in alcoholic potassium hydroxide. Its vat is reddish-violet and dyes cotton bluish-violet which soaps off almost completely. Upon fusion in alcoholic potassium hydroxide, a blue-violet melt is obtained. The vat is violet and cotton is dyed a rather weak violet-blue shade, fast to soaping.

Example 3

6.2 parts of Bz1,Bz1'-benzanthronyl diselenide, 5.1 parts of 1-chloro-2-amino-anthraquinone and 2 parts of sodium acetate are introduced into 120 parts of o-dichlorobenzene and the mixture boiled for about ten hours or until a test portion gives a bluish-green coloration when dissolved in sulphuric acid. The charge is cooled and filtered and the residue freed of solvent by steaming or by other suitable means. The solid is then digested with warm sodium sulphide solution in order to remove a small amount of unchanged diselenide. A brown-yellow solid is thus obtained. It gives an intense bluish-green coloration in sulphuric acid and is differentiated from Bz1,Bz1' benzanthronyl selenide by this coloration (latter gives more bluish coloration) as well as by its behavior upon alcoholic potassium hydroxide fusion. It yields a green melt (not blue), a brown-violet vat (not pure blue) and the fusion product dyes cotton in weak blue-violet shades (compared with the stronger, more reddish-violet dyeing of isodibenzanthrone).

Example 4

6.2 parts of Bz1,Bz1'-benzanthronyl-diselenide, 5.2 parts of 1-amino-6-chloro-anthraquinone and 2 parts of sodium acetate are stirred into 80 parts of molten naphthalene and the mixture heated to reflux for 15 to 20 hours. It is then cooled slightly, diluted with solvent naphtha, cooled to 30° C. and filtered. The solid is washed with alcohol, then with water. A yellow-brown solid is obtained. More of the same material may be recovered from the filtrate by dilution with alcohol, filtration, etc. This solid gives a very dark green coloration when dissolved in sulphuric acid. It vats readily giving a brown-violet vat which dyes cotton pale bluish-violet shades which are not fast to soaping.

It gives a violet coloration in alcoholic potassium hydroxide. Upon heating to 120° C. or above, a violet-blue melt is obtained. The vat is reddish-violet and cotton is dyed in blue-violet shades which are fast to soaping but become redder when wet.

*Example 5*

42 parts of 2,2'-dianthraquinonyl-diselenide (obtainable by air oxidation of the reaction product of sodium selenide and 2-halogen-anthraquinone), 42 parts of alpha, Bz1-dichloro-benzanthrone (obtainable by chlorination of the alpha-chloro-benzanthrone from alpha-chloro-anthraquinone), 15 parts of anhydrous sodium acetate and 0.7 parts of copper powder are introduced with stirring into 800 parts of tetraline and the mixture heated to reflux for about 24 hours. Upon cooling and filtering off, as usual, a rich brown solid is obtained. It gives an intense violet-blue coloration in sulphuric acid and contains both chlorine and selenium.

*Example 6*

6.2 parts of Bz1,Bz1'-benzanthronyl-diselenide, 4.9 parts of 1-chloro-anthraquinone and 2 parts of technical calcium hydroxide are suspended in 100 parts of high-boiling kerosene and the mixture heated to 185–190° C. for about 10 hours. By cooling, filtering, steaming off the kerosene and finally extracting with hot dilute hydrochloric acid, an orange product similar to that of Example 1 is obtained in excellent yield.

*Example 7*

10 parts of 1-amino-2-bromo-anthraquinone and 10.5 parts of Bz1,Bz1'-benzanthronyl-diselenide are introduced into 200 parts of trichlorobenzene and the mixture heated to boiling for about 10 hours. The brown solid obtained upon cooling and filtering gives a brown coloration in sulphuric acid and a brown melt when heated with alcoholic caustic potash at 120–150° C. From this melt a brown vat is obtained from which cotton is dyed in gray shades.

In the above examples the anthraquinone selenols or benzanthrone selenols may be substituted for the corresponding diselenides mentioned therein, without any material alteration in the procedure outlined. The corresponding alkali-metal selenolates (for instance sodium or potassium) may also be used to replace the diselenides mentioned in the examples without materially altering the conditions of the reaction. When the selenolates are used, however, the acid binding agent may be omitted since the alkali-metal present in the selenolate is sufficient to combine with the halogen liberated during the reaction and functions as an acid binding agent.

The particular temperatures used in carrying out the reaction are subject to wide variation, depending of course on the nature of the substituents present in the reacting molecules. Other inert solvents than those specifically mentioned in the examples may be used.

In the following claims the terms "a Bz1-halogen-benzanthrone", "a halogen-anthraquinone", "a Bz1-benzanthronyl-diselenide" or "an anthraquinone diselenide" or similar expressions are used to indicate these compounds when they are unsubstituted or when they contain other monovalent substituents.

I claim:

1. A Bz1-benzanthronyl-anthraquinonyl selenoether.

2. In the preparation of mixed benzanthronyl-anthraquinonyl selenoethers the step which comprises heating a compound of the benzanthrone series with a compound of the anthraquinone series, one of which is in the form of its selenol, diselenide or alkali-metal selenolate, the other being substituted by a halogen atom the reactive substituent in the benzanthrone compound being in the Bz1 position.

3. In the preparation of mixed benzanthronyl-anthraquinonyl selenoethers the step which comprises heating a Bz1-halogen-benzanthrone compound with a compound of the group consisting of an anthraquinone selenol, an anthraquinone alkali-metal selenolate and an anthraquinone diselenide in the presence of a relatively high boiling solvent.

4. In the preparation of mixed benzanthronyl-anthraquinonyl selenoethers the step which comprises heating a halogen-anthraquinone compound with a compound of the group consisting of Bz1-benzanthronyl-selenol, Bz1-benzanthronyl-alkali-metal selenolate and Bz1,Bz1'-benzanthronyl-diselenide.

MELVIN A. PERKINS.